Patented Apr. 27, 1948

2,440,383

UNITED STATES PATENT OFFICE 2,440,383

SYNERGISTIC ANTIOXIDANT COMPOSITION OF THE ACIDIC TYPE

Roy W. Riemenschneider, Glenside, and Jack Turer, Philadelphia, Pa., assignors to the United States of America as represented by the Secretary of Agriculture No Drawing. Application April 24, 1943, Serial No. 484,347

7 Claims. (Cl. 260—398.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to antioxidant compositions, and more particularly to rancidity inhibitors for fats and oils.

To inhibit oxidative rancidity, the objectionable odor and flavor imparted to fats and oils by the action of atmospheric oxygen, it is common practice to incorporate various antioxidants or rancidity-inhibiting agents with oleaginous materials.

Rancidity inhibitors may be classified into three groups:

1. Acidic inhibitors, such as phosphoric, oxalic, citric, tartaric, ascorbic and malic acids.
2. "Inhibitols," natural compounds occurring in the unsaponifiable fraction of vegetable oils, for example, alpha-tocopherol (vitamin E) and its isomers and analogues.
3. Phenolic inhibitors, for instance, pyrogallol, catechol, alpha-naphthol and hydroquinone.

A synergistic or enhancing antioxidant effect has heretofore been observed for some rancidity-inhibiting agents of the acidic type used in conjunction with certain inhibitors of the inhibitol or phenolic type. Also, Wells and Riemenschneider have shown in their application for patent, Serial No. 472,280, filed January 13, 1943, now Patent No. 2,368,435, that ascorbyl monoesters of fat acids are fat-soluble substances having excellent rancidity-inhibiting properties.

We have found that synergistic antioxidant action results when acidic inhibitors are used in conjunction with phospholipids, for example, soybean phospholipids (commercial lecithin). The acidic component may be a compound containing a hydroxyl group or a carboxyl group, or both, or a compound containing an amino group and a carboxyl group. For example, a marked increase in stability results when small amounts of soybean phospholipids and ascorbyl monoesters of fat acids are added to fatty material. This increase in stability is much greater than the additive effect of either substance used singly.

The term "ascorbyl monoesters of fat acids," as used herein, is defined as the monesters of saturated aliphatic monocarboxylic acids containing from 12 to 18 carbon atoms per molecule with compounds of the ascorbic acid series having the general formula:

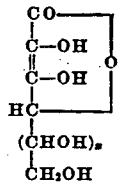

where $x$ represents 0 or a whole number not exceeding 3. Thus, the term "ascorbyl esters of fat acids" is meant to include such compounds as the palmityl, stearyl, myristyl, lauryl esters of d- and l-ascorbic and isoascorbic acids, or of other compounds of the ascorbic acid series, used either singly or in combination.

Ascorbyl monoesters of fat acids are obtainable by the interaction of compounds of the ascorbic acid series with aliphatic monocarboxylic acids in the presence of concentrated sulfuric acid, according to methods described by Wells and Swern in their applications for patent, Serial Nos. 442,557 and 442,558, filed May 11, 1942, now Patents No. 2,408,897 and No. 2,-350,435. According to the methods disclosed in these applications, the monocarboxylic acid and the compound of the ascorbic acid series are dissolved in concentrated sulfuric acid and the mixture is maintained at a suitable temperature, preferably at ordinary room temperature, for a length of time necessary to effect esterification, which usually requires 16 to 20 hours. The monoester is then isolated from the sulfuric acid solution by any suitable procedure; for instance, by dilution with water followed by solvent extraction.

The method of preparing these monoesters is further illustrated by the following examples:

Example I l-ascorbyl palmitate, the palmitic acid monoester of l-ascorbic acid, is prepared by dissolving 8.8 grams of l-ascorbic acid and 10.3 grams of palmitic acid in 100 cc. of 95 percent sulfuric acid at essentially room temperature. The solution is allowed to stand for about 16 hours after which the reaction mixture is poured slowly and with vigorous stirring into about 500 grams of chopped ice. The stirring is continued until the oily phase of the mixture has solidified. The mixture is then extracted with ethyl ether and the ether extract is washed with water until the washings are substantially free of mineral acid. The ether extract is then dried and evaporated to dryness and the residue remaining is powdered and washed by decantation with 200 to 300 cc. of petroleum ether (boiling range 35° to 60° C.), thereby removing unreacted palmitic acid from the reaction product. The white solid residue is insoluble in petroleum ether and consists essentially of ascorbyl monopalmitate. The yield is good.

*Example II*

8.8 grams of d-isoascorbic acid are esterified with 10.3 grams of palmitic acid in 100 cc. of 95 percent sulfuric acid by the procedure described in Example I. The reaction product after removal of unreacted palmitic acid consists essentially of d-isoascorbyl monopalmitate. The yield is good.

Our invention is illustrated by the following tabulations of experimental data. In these tables the stability of the tested materials is indicated by the length of time required to attain a peroxide content equal to 20 milli-equivalents per kilogram of the fatty substrate. The stability was determined by the Swift stability test, also known as the "Active oxygen method," in which air is bubbled at a uniform and definite rate through samples of the fatty material maintained at 100° C. At regular intervals the samples are tested for peroxide content by determining the amount of free iodine liberated from potassium iodide by the peroxide-like oxidation products formed in the fatty material.

*Table I*

| Substrate used | Rancidity-inhibiting agents added | | | Stability, hours |
|---|---|---|---|---|
| | Soybean phospholipids, per cent | Ascorbyl Monoester | | |
| | | Monoester used | Amount, per cent | |
| Prime steam: Lard A | | | | 2½ |
| Do | 0.03 | | | 5½ |
| Do | | isoascorbyl stearate | 0.47 | 2½ |
| Do | 0.03 | do | 0.47 | Over 56 |
| Do | 0.03 | do | 0.12 | 20 |
| Prime steam: Lard B | | | | 4 |
| Do | 0.03 | | | 7¼ |
| Do | | isoascorbyl stearate | 0.06 | 4¼ |
| Do | 0.03 | do | 0.06 | 26 |
| Do | | do | 0.12 | 6½ |
| Do | 0.03 | do | 0.12 | 44½ |
| Prime steam: Lard C | | | | 7¼ |
| Do | 0.03 | | | 10 |
| Do | | isoascorbyl stearate | 0.06 | 4¾ |
| Do | 0.03 | do | 0.06 | 31 |
| Prime steam: Lard D | | | | 9½ |
| Do | 0.03 | | | 12 |
| Do | | isoascorbyl stearate | 0.06 | 13¾ |
| Do | 0.03 | do | 0.06 | 50 |
| Prime steam: Lard E | | | | 7¾ |
| Do | 0.03 | | | 10¾ |
| Do | | isoascorbyl stearate | 0.06 | 13 |
| Do | 0.03 | do | 0.06 | 52¼ |
| Edible oleo-oil from beef fat | | | | 6¾ |
| Do | 0.03 | | | 19½ |
| Do | | isoascorbyl stearate | 0.06 | 5¾ |
| Do | 0.03 | do | 0.06 | 60½ |

*Table II*

| Substrate used | Rancidity-inhibiting agents added | | | Stability, hours |
|---|---|---|---|---|
| | Soybean phospholipids, per cent | Acidic Inhibitor | | |
| | | Inhibitor used | Amount, per cent | |
| Prime steam: Lard F | | | | 7 |
| Do | 0.03 | | | 10 |
| Do | | Citric acid | 0.10 | 7¾ |
| Do | 0.03 | do | 0.10 | 12½ |
| Do | | Tartaric acid | 0.10 | 8½ |
| Do | 0.03 | do | 0.10 | 13 |
| Do | | Tartaryl palmitate | 0.29 | 11¼ |
| Do | 0.03 | do | 0.29 | 13½ |
| Do | | d-isoascorbic acid | 0.10 | 8¼ |
| Do | 0.03 | do | 0.10 | 31½ |
| Do | | l-ascorbic acid | 0.10 | 10½ |
| Do | 0.03 | do | 0.10 | 47¼ |

Our invention is not limited to the specific examples listed in the above tables. It is applicable to any oleaginous material of the glyceride type or other esters of fat acids.

Having thus described our invention, we claim:

1. An antioxidant composition comprising phospholipids and an ascorbyl monoester of a saturated aliphatic monocarboxylic acid containing 12 to 18 carbon atoms per molecule.

2. An antioxidant composition comprising soybean phospholipids and isoascorbyl monostearate.

3. The method of inhibiting oleaginous materials of the glyceride type and other esters of fat acids against oxidative rancidity, which comprises incorporating therewith phospholipids and an ascorbyl monoester of fat acids.

4. The method of inhibiting oleaginous materials of the glyceride type and other esters of fat acids against oxidative rancidity, which comprises incorporating therewith soybean phospholipids and an ascorbyl monoester of fat acids.

5. An oleaginous composition comprising esters of fat acids, having incorporated therein in amounts sufficient to inhibit the development of oxidative rancidity, phospholipids, and an ascorbyl monoester of fat acids.

6. An oleaginous composition comprising esters of fat acids, having incorporated therein in amounts sufficient to inhibit the development of oxidative rancidity, soybean phospholipids, and an ascorbyl monoester of fat acids.

7. An antioxidant composition consisting of phospholipids and an ascorbyl monoester of a saturated aliphatic monocarboxylic acid containing 12 to 18 carbon atoms per molecule.

ROY W. RIEMENSCHNEIDER.
JACK TURER.

REFERENCES CITED

The following references are of record in the file of this patent:

UNITED STATES PATENTS

| Number | Name | Date |
|---|---|---|
| 2,098,254 | Mattill | Nov. 9, 1937 |
| 2,198,208 | Musher | Apr. 23, 1940 |
| 2,383,815 | Riemenschneider | Aug. 28, 1945 |

OTHER REFERENCES

Jr. Am. Chem. Soc., Nov. 1936, pp. 2204–8.
Food Industries, Nov. 1942, page 74.